June 28, 1966 P. ULRICH ETAL 3,257,877
POWER WRENCHES
Filed July 29, 1963 5 Sheets-Sheet 1
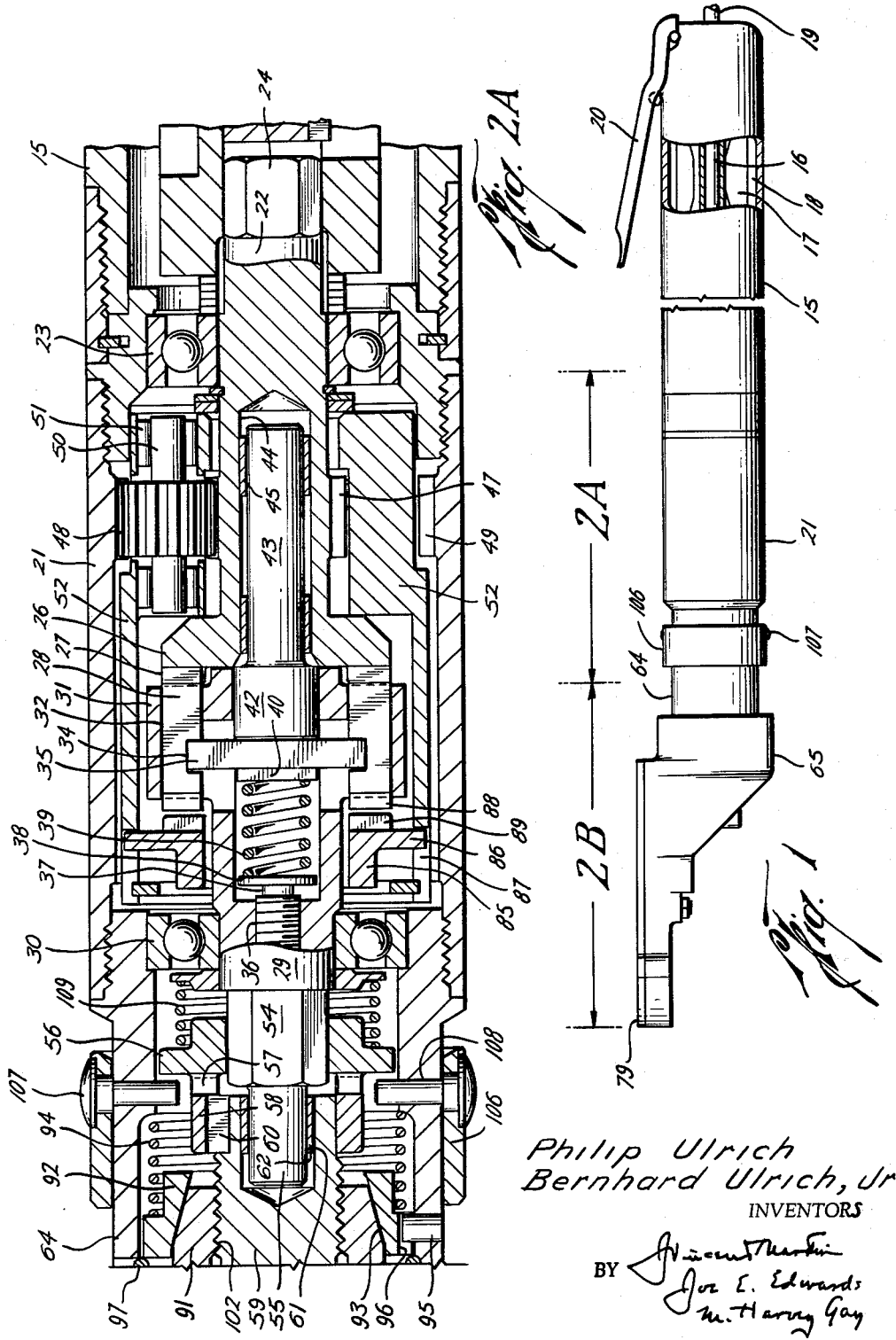
Philip Ulrich
Bernhard Ulrich, Jr.
INVENTORS
BY
ATTORNEYS

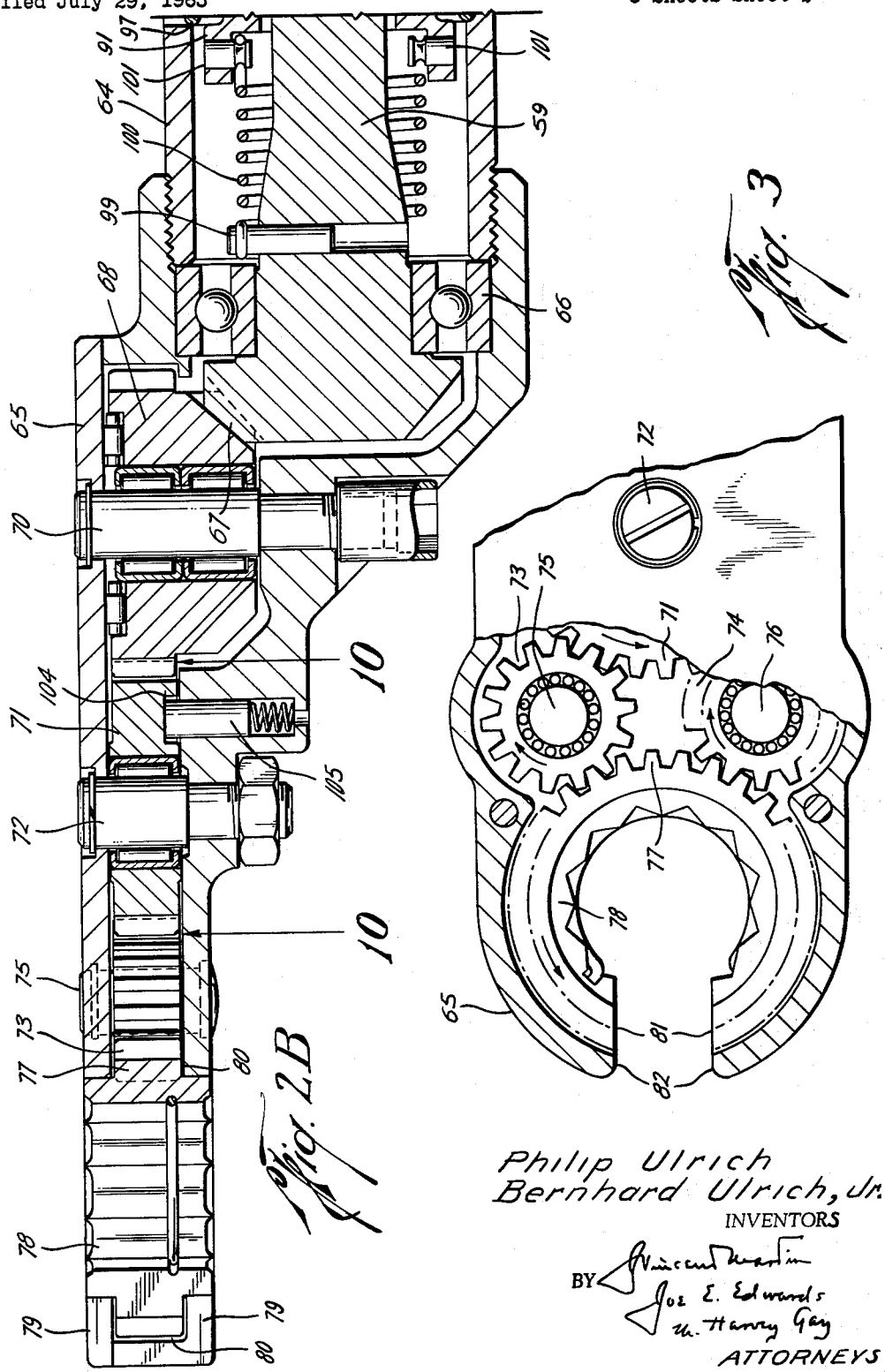

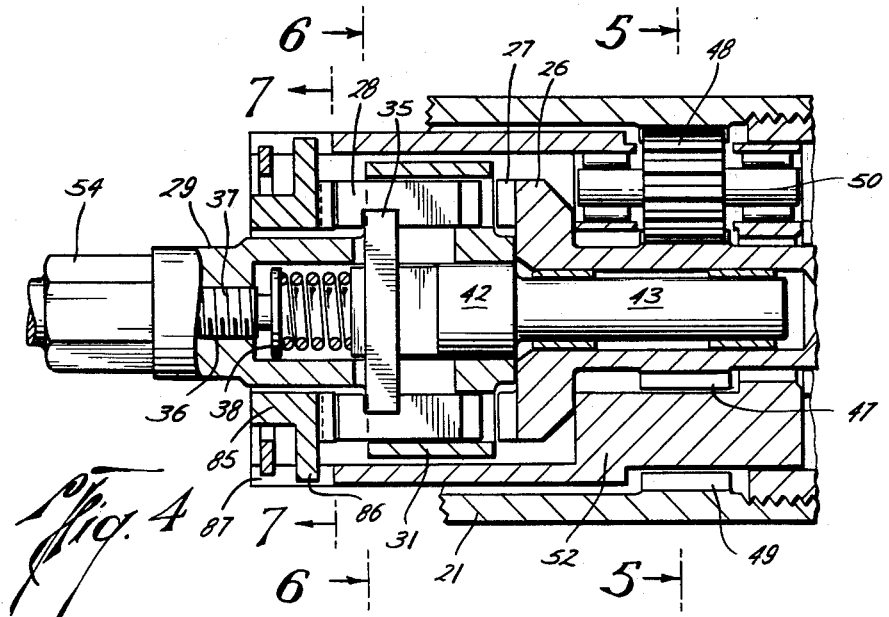
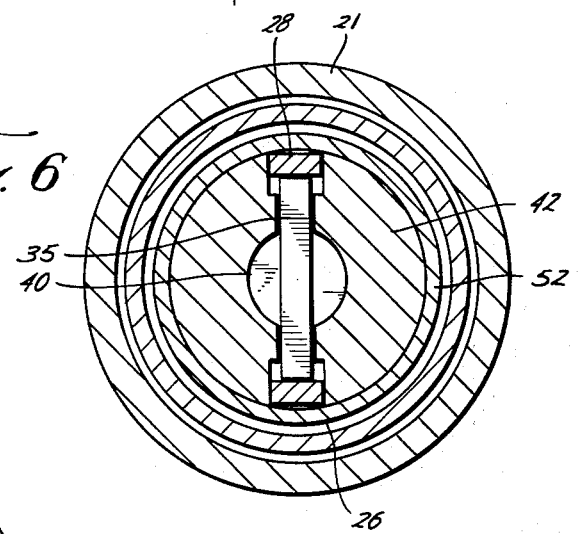
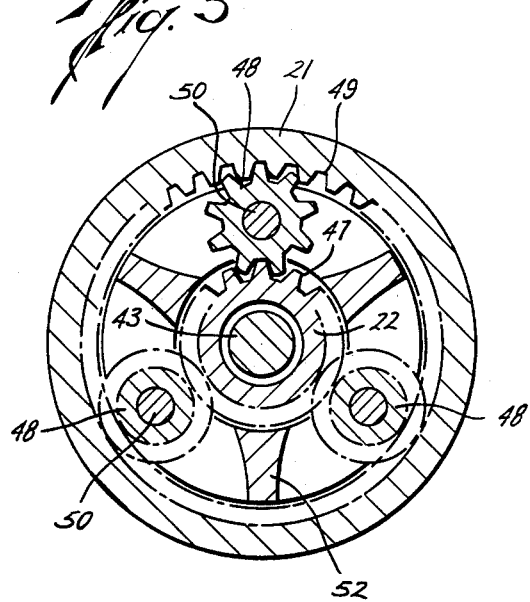
Philip Ulrich
Bernhard Ulrich, Jr.
INVENTORS

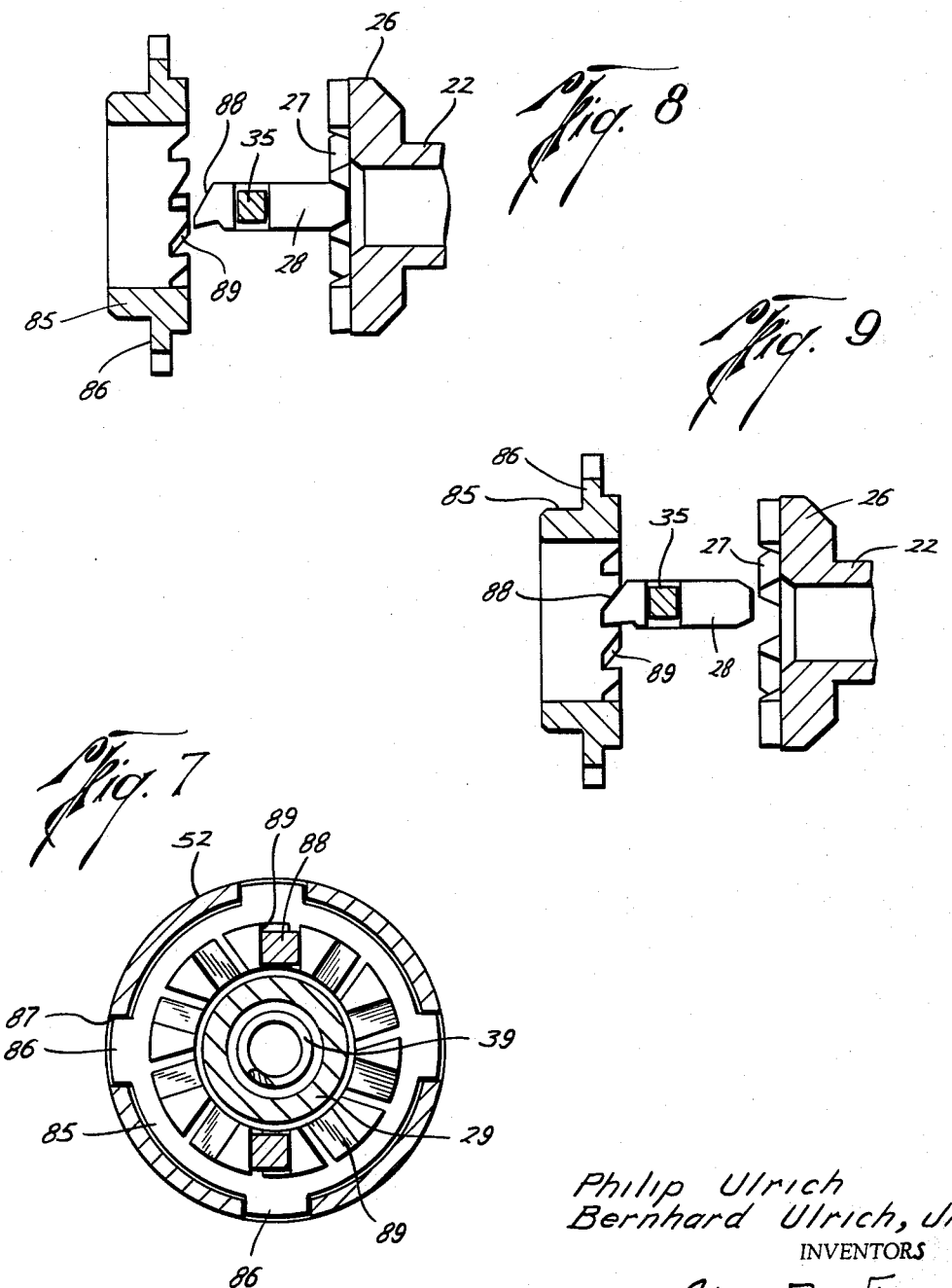

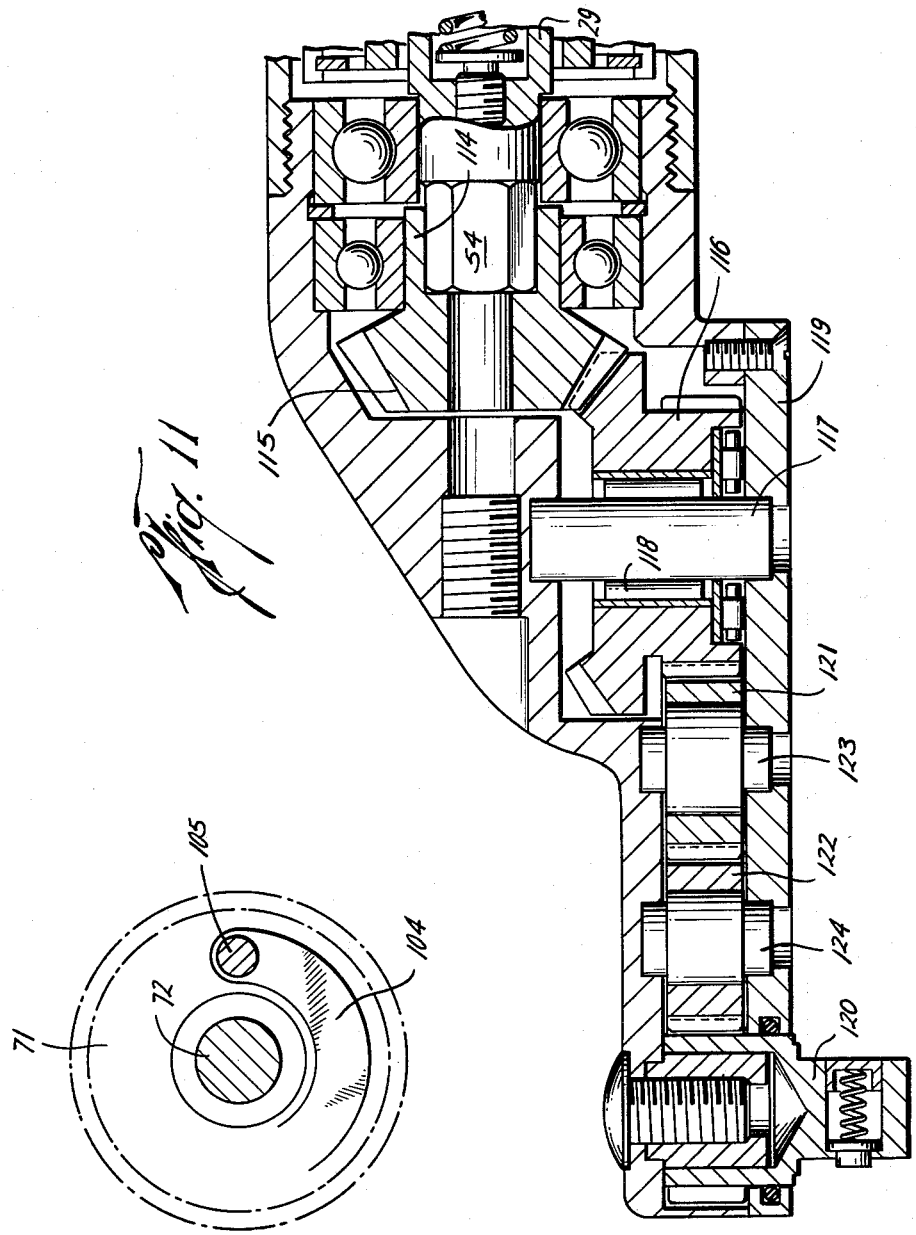

United States Patent Office 3,257,877
Patented June 28, 1966

3,257,877
POWER WRENCHES
Philip Ulrich and Bernhard Ulrich, Jr., Corpus Christi, Tex., assignors to Reed Roller Bit Company, Houston, Tex., a corporation of Texas
Filed July 29, 1963, Ser. No. 298,272
7 Claims. (Cl. 81—57)

The present invention relates broadly to power operated tools and more specifically to a multi-speed drive mechanism therefor that is controlled by the torque developed by the tool.

In power operated tools, such as tubing wrenches, nut setters, screw drivers, and the like, the initial operation is usually carried out at a high speed and a low torque, while the final operation usually requires a low speed and high torque due to a change in load requirements that are imposed upon the tool. In certain types of power operated tools, a clutch mechanism is employed which is responsive to a predetermined torque, so that when the final tightening action commences, and the predetermined torque is developed, the clutch members will separate and thus disrupt the tool driving mechanism. Other types of power operated tools have employed a driving mechanism which is adapted to operate at a high speed during the initial or unresisted driving period of the tool, but is designed to automatically change to a low speed driving mechanism when a resistance to said driving action is developed or created in said tool. In tools of this type, the transmission or gear drive mechanism required to effect such a change in the driving speed have usually involved relatively complex and complicated gear shifting arrangements in order to effect the desired change from one driving speed to the other driving speed.

One of the objects of the present invention is to provide a power operated tool having a drive mechanism connecting a driving shaft with a driven shaft in substantially a constant speed ratio and with means to effect a change in said mechanism to vary the drive ratio between the driving shaft and the driven shaft.

Another object is to provide a power operated tool having a transmission designed to initially operate under certain conditions at a constant speed ratio, but under other conditions, automatically shifts into a different drive ratio during the final stages of operation.

Another object is to provide a power operated tool having a transmission including a planetary gear unit with said transmission being operable to rotate the driving and driven shafts at the same speed but provided with control means to effect a change therein in order to drive through the planetary gear unit for varying or changing the speed ratio between the driving and driven shafts.

A further object is to provide a power operated tool having a drive mechanism including a planetary gear unit wherein said mechanism is designed to rotate a driven shaft at the same speed of a driving shaft until a pre-set torque condition is reached at which time, the drive mechanism will automatically shift to drive through the planetary gear unit at a different ratio between the driving and driven shafts.

A still further object is to provide a power operated tool having a drive mechanism designed to operate at a high speed and a low torque until the force of a spring member is overcome by the torque developed to effect the disengagement of a clutch member in said driving mechanism while bringing into operative driving relation through another clutch member a planetary gear system for operating the driving mechanism at a low speed and a high torque.

Another object of the present invention is to provide a power operated tool having a transmission which is relatively simple and compact in construction and which is readily shiftable so as to provide a plurality of driving ratios.

Other objects and advantages more or less ancillary to the foregoing in the manner in which all of the various objects are realized, will appear in the following description, which, when considered in connection with accompanying drawings, sets forth the preferred embodiment of the invention.

Referring to the drawings wherein the preferred embodiment of the invention is illustrated:

FIGURE 1 is an elevational view of a power operated tool embodying the present invention with a portion of the casing being broken away in vertical cross section;

FIGURE 2A is a longitudinal sectional view of a portion of the driving mechanism of a power operated tool embodying the present invention, the view being of the portion of the tool designated 2A in FIGURE 1;

FIGURE 2B is a longitudinal sectional view showing a portion of the driving mechanism of a power operated tool embodying the present invention and also illustrating a tubing wrench of the open end ratchet type and the drive mechanism therefor, the view being of the portion of the tool designated 2B in FIGURE 1;

FIGURE 3 is a plan view partly in section showing the open end wrench portion of the tool illustrated in FIGURE 2B and the drive mechanism therefor;

FIGURE 4 is a sectional view of a fragmentary portion of the tool shown in FIGURE 2A and illustrates the drive mechanism in one condition of operation;

FIGURE 5 is a cross sectional view of the tool embodying the present invention and showing the planetary gear unit constituting a part of the transmission of the tool of the present invention, the view being taken on a plane indicated by the line 5—5 of FIGURE 4;

FIGURE 6 is a cross sectional view showing a detailed portion of the clutch mechanism, the view being taken on a plane indicated by the line 6—6 of FIGURE 4;

FIGURE 7 is a cross sectional view of another portion of the driving mechanism, the view being taken on plane indicated by the line 7—7 of FIGURE 4;

FIGURE 8 is a detailed view in section showing the clutch mechanism in one stage of operation;

FIGURE 9 is a detailed view in section showing the clutch mechanism in another stage of operation;

FIGURE 10 is a detailed sectional view of one of the gears of a gear train and showing means to limit rotative movement of said gear train, the view being taken on a plane indicated by the line 10—10 of FIGURE 2B, and FIGURE 11 is a longitudinal sectional view of an alternate form of tool, such as a nut runner, which can be used in lieu of the tubing wrench shown in FIGURE 2B.

Referring to FIGURES 1 through 3 of the drawings, there is shown a tubing wrench embodying the present invention and which is operated by a pneumatically driven vane motor positioned within a housing or casing 15. The motor includes a rotor 16 having a plurality of vanes 17 mounted thereon in radial slots and which are rotatably positioned within a stator 18. The rotor and vanes are rotatably driven by a stream of air delivered to the casing 15 through a coupling or fitting 19, with the admission of said air being controlled by a hand lever 20 pivotally mounted upon said casing and designed to actuate a suitable valve, not shown, positioned within the casing. Inasmuch as the motor does not constitute a part of the present invention, a more detailed description is not believed to be necessary but said motor is shown and described as being typical of a type that can be employed for actuating a tool embodying the present invention.

The housing or casing 15 has threadedly secured to its forward end thereof an extension 21, which has therein a spindle 22 that is rotatably mounted within suitable bearing blocks 23. The spindle 22 constitutes the input shaft or driving member of the present invention and is shown formed with a hex end 24 to facilitate its connection to the pneumatically operated vane motor. It is to be understood, however, that any other suitable type of connection may be employed for rotatably driving the spindle 22 within the housing or casing 21. The spindle 22 terminates in an enlarged end portion 26 that has formed on its forward face a plurality of spaced teeth 27 which engage dog members 28 mounted within an elongated carrier or driven member 29. The carrier 29, which is mounted in suitable bearings 30 for rotative movement within the casing 21, is formed with an enlarged hollow end portion 31 that has a plurality of spaced slots 32 provided therein for slidably receiving and retaining the dog members 28.

The inner surface or face of each of the dog members 28 is formed with a slot 34 designed to receive a key or member 35 that is provided with oppositely disposed flat faces or surfaces for engagement with the ends of the slots or recesses 34 in the dog members 28. The portion of the carrier 29 contiguous its enlarged hollow end portion 31 is counterbored at 36 to receive an adjustable pin 37. The pin 37 is formed with an enlarged head member 38 which receives and supports one end of a coil spring 39 with the other end of the spring being seated upon a pad or plate 40 carried by the key 35. The pin 37 being adjustable within the counterbore 36 can through such an adjustment vary the force that the spring 39 imposes upon the key 35. Thus, the force or pressure exerted by the spring 39 against the key 35 is in turn transmitted to the dog members 28 for sliding same into meshing engagement with the teeth 27 formed on the end 26 of the spindle 22. The key 35, under the action of the spring 39, is also retained in engagement with the enlarged end portion 42 of a pilot shaft 43 that is positioned within a counterbore 44 formed in the spindle 22. A plurality of needle bearings 45 positioned within the counterbore 44 between the spindle 22 and the pilot shaft 43 permit the spindle to have a free rotative movement with respect to said pilot shaft. However, due to the angular configuration of the teeth 27 formed on the enlarged end portion 26, there is a limit of travel between the dog members 28 and said teeth which prevents any binding action developing between the key 35 and the enlarged end portion 42 of the pilot shaft 43.

The spindle 22 forms part of a planetary gear reduction unit, as shown in FIGURES 2A and 5, and it has formed thereon a sun gear 47. The teeth of the sun gear 47 engage the teeth of a plurality of planet gears 48 which are disposed concentrically about the spindle 22 and which planet gears mesh with an internal ring gear 49 formed on the inner surface of the housing or casing 21. The planet gears 48 are carried by pins 50 which are rotatably supported in needle bearings 51 and said planet gears are in turn mounted in and give rotation to a planet carrier 52. Thus, the rotative speed or movement of the driving member or spindle 22 is reduced one-third as represented by the rotative movement of the planet carrier 52 or the ratio of the speed of the driving member to that of the planet carrier is 3 to 1.

The forward end of the carrier or driven member 29 is formed with a reduced portion 54 of hexagonal configuration, which terminates in a further reduced end portion 55 of circular configuration. The hexagonal portion 54 of the driven member has mounted thereon for rotative movement therewith a dog clutch 56 that is configured to have a sliding movement on said portion whereby the teeth 57 of said clutch will engage suitable teeth on a clutch 58 that is secured to an end of a shaft member 59 by means of a key 60. The end of the shaft member, which carries the clutch 58, is formed with a recessed portion 61 that is adapted to receive the reduced end portion 55 of the carrier or driven member 29. Suitable needle bearings 62 are positioned within the recess 61 between the reduced end portion 55 and the shaft member 59 to facilitate rotative movement of the shaft member with respect to the carrier 29. The shaft member 59 as disclosed in connection with the tool embodying the present invention and as shown in FIGURES 2A and 2B constitutes an extension of the driven member or carrier 29. The shaft member 59 is positioned within a housing or casing 64 which has one end secured to an end of the casing 21, while the other end is mounted within a housing 65, FIGURE 2B. The housings or casings 21, 64, and 65 constitute extensions or sections of the housing or casing 15, as shown in FIGURE 1, as the use of a plurality of sections facilitate the ready separation of the tool to facilitate the making of repairs and replacement of parts.

The forward end portion of the shaft member 59 is rotatably mounted within suitable bearing supports 66 with the end of said shaft terminating in a bevel gear segment 67 that meshes with a second beveled gear 68 mounted upon a pin 70 within the housing 65. The bevel gear 68 is part of a gear train mounted within the housing 65 and said gear 68 meshes with a gear 71 that is rotatably supported upon a pin 72. The gear 71 engages a pair of horizontally disposed gears 73 and 74, FIGURE 3, which are rotatably mounted upon pins 75 and 76, respectively. The gears 73 and 74 engage the geared portion 77 of a socket wrench or member 78 that is rotatably mounted within and carried by the inturned flanges 79 of the housing 65, FIGURE 2B, which define an annular guideway 80 for the geared portion 77 of the socket wrench. The socket wrench 78 is formed with a gap or aperture 81 which is designed to register or coincide with the open end 82 in the end of the housing 65.

The carrier or driven member 29 has freely mounted thereon a clutch member 85 which is positioned adjacent the enlarged end portion 31 of the carrier as well as the dog members 28. The clutch member 85 is formed with a plurality of diametrically disposed segments 86 that project into slots 87 formed in the planet carrier 52, FIGURES 2A and 7. The dog members 28 are formed with forwardly extending projections or teeth 88, FIGURES 8 and 9, that are upon the shifting of the dog members designed to project into slots 89, provided on a face of said clutch member. The carrier or driven member 29 can initially be rotatably driven from the spindle 22 through the teeth 27 and dog members 28 in substantially a one to one ratio so that the same driving speed will be delivered to the socket member 78 as it is rotated within the guideway 80 in the end of the housing 65. Thus, the socket member in engaging a piece of work will continue to rotate at the speed of the spindle 22 until the piece of work tends to resist the continued rotation and by so doing, creates a certain degree of torque which will at a certain point exceed the force of the spring 39 that through the key 35 maintains the dog members 28 in engagement with the teeth 27. Upon the magnitude of the torque so created becoming greater than the force of the spring 39, the dog members 28 will bcome disengaged from the teeth 27 and the projections 88 on the dog members 28 will move into the slots 89 formed on the clutch member 85 and thus impart or deliver to the carrier 29 the rotative movement of the planet carrier 52, which is being rotatably driven at a substantially reduced rate of speed through the planetary gear unit. Thus, the carrier 29 and shaft member 59 in conjunction with its associated gear train will be rotated at a speed that is one-third of the r.p.m. that was initially delivered to the gear train by the carrier 29 and shaft member 59. The reduction in speed or rotative movement of the shaft member 59 and associated gear train has resulted, however, in a three fold increase in the torque that is being transmitted to the socket member 78.

The shaft member 59 adjacent the recessed end portion 61 has positioned thereon a pair of cone clutch members 91 and 92 which are formed with a mutual contact face 93. The cone clutch member 92 is engaged by a coil spring 94 which tends to continuously urge said clutch members into engagement along the mutual contact face 93. A stop pin 95 carried by the casing 64 extends into a slot 96 formed in the cone member 92, FIGURE 2A, to restrain said member from any rotative movement with respect to the shaft 59 and cone clutch 91. The casing 64 also carries a stop wire 97, FIGURE 2A, which is designed to limit the forward movement of the cone clutch member 92 under the action of the coil spring 94. As shown in FIGURE 2B, the shaft member 59 has mounted therein a pin 99 which has one end of a torsion spring 100 secured thereto. The spring 100 encircles the shaft member 59 and has its other end secured to the male cone clutch member 91 by an anchor pin 101. The clutch member 91 is provided with a plurality of anchor pins 101 in order to permit adjustment of the torsion spring 100 with respect to the shaft member 59 and the clutch member 91. The cone clutch member 91 is mounted on the shaft member 59 by means of a thread 102, FIGURE 2A.

Thus, each time that rotation initially commences in shaft member 59 through carrier 29, and clutch 56, there will be approximately two and one-half revolutions of energy stored in torsion spring 100 and during this initial rotation of shaft member 59, cone clutch member 91 will tend to move towards torsion spring 100 along the thread 102 provided on said shaft member. This movement of clutch member 91 causes cone clutch member 92 to follow along shaft 59 under the action of coil spring 94 until such time as clutch member 92 engages the stop wire 97. At approximately the time that the clutch member 92 engages the stop wire 97, the approximately two and one-half revolutions of energy has been reached and stored in torsion spring 100 so that cone clutch member 91 can then slip along the mutual contact surface or face 93 but the approximately two and one-half revolutions of energy that have been stored in torsion spring 100 will remain in said spring.

The energy stored in torsion spring 100 is utilized to bring into registry the gap or aperture 81 in socket member 78 with the opening 82 in the end of the wrench housing 65 in the event that upon the completion of the operation performed by the tool that said gap is not in registry with the opening. In order to effect or bring about the registry of the gap and opening, the gear 71 has formed in the bottom face or surface thereof an annular tapered slot or ramp 104, FIGURES 2B and 10. The slot or ramp 104 is cut through a 90° arc in the surface of gear 71 with the deepest portion of the slot being accurately positioned with respect to the teeth on said gear so that the slot or ramp 104 can be indexed with respect to the gap 81 in the socket member 78 when it has been positioned so as to register with the opening 82 in the end of the wrench housing 65. A spring loaded stop pin 105 is carried by the housing 65 and registers with the tapered slot or ramp 104 to permit the gear 71 to run or rotate freely in a forward direction, but said pin prevents or stops any reverse direction rotation at that position of the gear where it is indexed to present align openings with respect to the socket member and the end of the wrench housing 65. In the event that gap 81 is not in registry with opening 82, when the operation of the tool has been completed, the reverse rotation of the socket member 78 so as to bring gap 81 into registry with opening 82 is derived from the approximately two and one-half revolutions of energy stored in torsion spring 100. This reverse rotation of socket member 78 is arrived at by manually rotating a sleeve or collar 106 mounted on housing 64, which collar has fixed therein a pair of cam pins 107 that move through cam slots 108 formed in the housing 64. The cam pins 107 engage the dog clutch 56 and slidably urge said dog clutch along hexagonal portion 54 against a spring 109 so as to disengage said clutch member from clutch 58, which movement releases the shaft member 59. The shaft member 59 and bevel gear 67 will then be rotated, under the action of the energy stored in torsion spring 100, in a reverse direction and thereby impart a reverse rotative movement through the gear train to wherein the reverse rotative movement of gear 71 will be stopped by pin 105 to bring gap 81 of the socket member 78 into registry with opening 82. Any energy that might still remain in torsion spring 100 will impart a rotative movement to cone clutch member 91 to move same along the thread 102 on shaft member 59 so as to bring cone clutch member 91 into engagement with cone clutch member 92 and thus move cone clutch member 92 away from the stop wire 97 and against the coil spring 94.

In the operation and use of the open-end power wrench shown in FIGURES 2A and 2B, the socket member 78 is configured to engage a hex fitting of a tubing connection and by reducing the size of the housing 65 at the end of the wrench, same can be readily inserted into restricted areas for the purpose of engaging said fittings to run them down in a two-speed-torque operation. The initial operation of the power wrench in running down the hex fittings is carried out at a high speed and a low torque with the tool or wrench being set up with a pre-set torque. The pre-set torque is determined and the wrench adjusted for same by properly positioning the pin 37 in the bore of the carrier 29 to determine the pressure of the coil spring 39 bearing against the key 35 for holding the dog members 28 into engagement with the teeth 27 on the end 26 of the spindle 22. Thus, with the spindle 22 being driven by the rotor 16 of the pneumatic motor, the end portion 26 of said spindle will rotatably drive the carrier 29 through the teeth 27 and dog members 28. The ratio of the drive from the spindle 22 to the carrier 29 by way of the dog members will be at a one to one ratio, and the rotative movement of the carrier 29 will be transmitted to the shaft member 59 through the clutches 56 and 58. Thus, bevel gear 67 formed on the end of shaft member 59 will drive gear 68, which, in turn, drives gear 71 that transmits its motion to the socket member 78 by means of gears 73 and 74. Thus, the socket member 78 will be rotated within the housing 65 with the geared portion 77 of the socket member moving through the passageway 80 of the housing for the purpose of rotating or running down the hex fitting of the tubing connection.

The running down or tightening of the hex fitting of the tubing connection will be carried out at a high speed and low torque until there is a gradual build up of a torque condition in the fitting and tool as said fitting commences to bottom. Thus, when the magnitude of the torque that is building up in the hex fitting becomes greater than the force of the coil spring 39 acting on the dog members 28 through the key 35, said dog members 28 will become disengaged from the teeth 27 on the end portion 26 of the spindle 22 and the projections 88 on said dog members 28 will move forwardly into the slots 89 on the clutch member 85. This movement of the dog members will result in the rotative movement of the clutch 85, which is derived from the planet carrier 52, being transmitted to the end portion 31 of the carrier 29 which will then be rotatably driven at one-third of its previous speed inasmuch as the planet carrier 52 is being rotated at a three to one ratio with respect to the spindle 22 due to the planetary gear transmission unit that is driven by the sun gear 47 mounted on and carried by the spindle 22. The carrier 29 is now driven at a low speed and high torque and said rotative movement is transmitted to the socket member in the same manner as the high speed was previously transmitted so as to provide said socket member with a low speed at a high torque for the final setting or tightening of the hex fitting of the tubing connection.

When the hex fitting of the tubing connection has been tightened or finally run down, the power wrench may be readily withdrawn from said fitting if the gap 81 in the socket member 78 is in registry with the opening 82 in the end of the wrench housing 65. In the event that the gap 81 and opening 82 are not in registry with one another, it will be necessary to manually release the clutch 56 from the clutch 58 in order to bring the gap 81 into registry with the opening 82. Upon the initial operation of the tool or power wrench, approximately two and one-half revolutions of energy will have been stored in the torsion spring 100 upon the initial rotation of the shaft member 59 so that a manual rotation of the sleeve 106 on the housing 64 will move the pins 107 and thus, the clutch member 56 out of engagement with clutch 58 by compressing spring 109 so that the energy stored in torsion spring 100 will cause shaft member 59 to rotate in a reverse direction. This movement of shaft 59 will be transmitted to the gear train until such time as the stop pin 105 reaches the end of slot 104 so as to bring the gap 81 into registry with the opening 82 whereby the power wrench may then be readily removed from the fitting. The remaining energy stored in torsion spring 100 will then cause clutch members 91 and 92 to move along the shaft member 59 and against the coil spring 94 at which time the manual pressure that was applied to the sleeve 106 for rotating the pins 107 in the cam slot 108 can be released and the force or action of the spring 109 will move the clutch member 56 into engagement with the clutch member 58 and at the same time, impart a rotative movement to said sleeve 106 for returning same to its initial or inoperative position.

In FIGURE 11, there is shown another power operated tool, such as a nut runner, that is designed to utilize the two-speed drive mechanism of the power tool shown in FIGURES 2A and 2B. In the power tool shown in FIGURE 11, the reset mechanism associated with gear 71 in the tool shown in FIGURES 2A and 2B is not required so the hexagonal portion 54 of the carrier 29 has socketed stem or shaft portion 114 of a beveled gear 115 mounted thereon. The bevel gear 115 meshes with a gear 116 that is rotatably supported upon a pin 117 by suitable bearings 118 within a housing 119. The gear 116 is adapted to rotatably drive the nut setting member 120 by means of the gears 121 and 122, which are mounted on pins 123 and 124, respectively within the housing 119.

Thus, in the use of the tool shown in FIGURE 11, the carrier 29 will initially be driven at a high speed and low torque in the same manner as the power tool disclosed in FIGURES 2A and 2B, and when a pre-set torque has developed in the tool, the drive will be through the planetary transmission unit so that the carrier 29 will then be driven at a low speed and high torque which will in turn be transmitted to the nut setting tool by means of the bevel gear 115 and the gear train driven thereby that is disposed and carried within the housing 119.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

We claim:

1. A power operated tool comprising a housing having a motor therein, a driving member positioned within said housing and connected to said motor, a driven member within said housing, a clutch member interconnecting said driving and driven members, a coil spring positioned within said housing and having one end secured to said driven member, a first annular member mounted on said driven member and connected to the other end of said spring, a second annular member positioned within said housing and having a sliding engagement with said first annular member, means carried by said housing and engaging said second annular member to restrain same against rotative movement with respect to said driven member, said coil spring storing a number of revolutions of energy therein upon the initial turning of said driven member and the movement of said first annular member along said driven member, a socket member rotatably mounted in said housing and having a gap therein registering with a slot in said housing during the initial work engaging position of said tool, a gear train mounted in said housing and connecting said socket member with said driven member for rotating said socket member in one direction, means carried by said housing for separating said driven member from said driving member for rotating said socket member in the other direction under the action of said coil spring, and means to control said rotation of said socket member to bring said gap into registry with said slot.

2. A power operated tool comprising a housing having a motor therein, a driving member positioned within said housing and connected to said motor, a driven member within said housing, a clutch member interconnecting said driving and driven members, a coil spring positioned within said housing and having one end secured to said driven member, a first annular member rotatably mounted on said driven member and connected to the other end of said spring, a second annular member positioned within said housing and having a sliding engagement with said first annular member, means carried by said housing and engaging said second annular member to restrain same against rotative movement with respect to said driven member, said coil spring storing a number of revolutions of energy therein upon the initial turning of said driven member and the movement of said first annular member along said driven member, a socket member rotatably mounted in said housing and having a gap therein registering with a slot in said housing during the initial work engaging position of said tool, a gear train mounted in said housing and connecting said socket member with said driven member for rotating said socket member in one direction, said housing having cam slots formed therein, a rotatable sleeve mounted on said housing in concentric relation with said cam slots, pins mounted in said sleeve and arranged to move through said cam slots upon the rotation of said sleeve for separating said driven member from said driving member for rotating said socket member in the other direction under the action of said coil spring, and means to control said rotation of said socket member to bring said gap into registry with said slot.

3. A drive mechanism for a tool comprising a housing having a motor therein, a driving member positioned within said housing and connected to said motor, a driven member within said housing, a sun gear on said driving member, a ring gear formed on the inner surface of said housing, a planet carrier carrying pinions meshing with said sun and ring gears, clutch means provided on the end of said driving member, a clutch element carried by said driven member and rotatably driven by said planet carrier, a shiftable clutch member carried by said driven member, a shaft having a beveled gear formed on one end thereof rotatably mounted in said housing, said shaft connected to said driven member, a spring actuated dog clutch slidably mounted on said driven member for rotation therewith, a clutch plate keyed to said shaft and meshing with said dog clutch for interconnecting said driven member to said shaft, a socket member rotatably mounted in said housing, a gear train in said housing connecting said beveled gear with said socket member, spring means carried by said driven member and engageable with said clutch member for maintaining said clutch member in engagement with said clutch means to rotate said socket member in one direction at the speed of said driving member, said clutch member being shiftable into engagement with said clutch element for rotating said socket member in the same direction at the speed of said planet carrier upon a torque developing in said driven member sufficient to overcome the force of said spring and means rotatably mounted on said housing and engaging said dog clutch for separating said dog clutch and clutch plate to permit said socket member to be rotated in the opposite direction.

4. A drive mechanism for a tool comprising a housing having a motor therein, a driving member positioned within said housing and connected to said motor, a driven member within said housing, a sun gear on said driving member, a ring gear formed on the inner surface of said housing, a planet carrier carrying pinions meshing with said sun and ring gears, clutch means provided on the end of said driving member, a clutch element carried by said driven member and rotatably driven by said planet carrier, a shiftable clutch member carried by said driven member, a shaft having a beveled gear formed on one end thereof rotatably mounted in said housing, a spring actuated dog clutch slidably mounted on said driven member for rotation therewith, a clutch plate keyed to said shaft and meshing with said dog clutch for interconnecting said driven member to said shaft, a torsion spring encircling said shaft and having one end secured thereto, a first annular member slidably mounted on said shaft and connected to the other end of said torsion spring, a second annular member positioned within said housing and having a sliding engagement with said first annular member, means carried by said housing and engaging said second annular member to restrain same against rotative movement with respect to said driven member, said torsion spring storing a number of revolutions of energy while moving said first annular member along said shaft upon the initial rotative movement of said shaft, a socket member rotatably mounted in said housing and having a gap therein registering with a slot in said housing during the initial work engaging position of said tool, a gear train in said housing connecting said beveled gear with said socket member, spring means carried by said driven member and engageable with said clutch member for maintaining said clutch member in engagement with said clutch means to rotate said socket member in one direction at the speed of said driving member while storing energy in said torsion spring, said clutch member being shiftable into engagement with said clutch element for rotating said socket member in the same direction at the speed of said planet carrier upon a torque developing in said driven member sufficient to overcome the force of said spring means, means carried by said housing and engageable with said dog clutch for moving said dog clutch out of engagement with said clutch plate for rotating said socket member in the other direction under the action of said torsion spring, and stop means to control said rotation of said socket member to bring said gap in registry with said aperture.

5. A drive mechanism as set forth in claim 4 wherein said means includes a plurality of cam slots formed in said housing, a rotatable sleeve mounted on said housing and overlying said cam slots, pins carried by said sleeve and movable through said cam slots upon the rotation of said sleeve to engage said dog clutch.

6. A drive mechanism as set forth in claim 4 wherein one of the gears in said gear train is formed with an annular tapered slot, a spring-loaded pin mounted in said housing and extending into said slot to limit the rotative movement of said socket member in the other direction to insure the registry of said gap with said slot.

7. A drive mechanism as set forth in claim 4 wherein said a first annular member mounted on said shaft is formed with a plurality of pins for connecting the other end of said torsion spring in order to adjust said torsion spring with respect to said shaft.

References Cited by the Examiner

UNITED STATES PATENTS

| 2,046,412 | 7/1936 | Reynolds. | |
| 2,787,180 | 4/1957 | Fish | 81—57 |
| 3,187,870 | 6/1965 | Simmons | 74—751 X |

FOREIGN PATENTS

| 610,490 | 12/1960 | Canada. |
| 278,074 | 1/1952 | Switzerland. |

WILLIAM FELDMAN, *Primary Examiner.*

JAMES L. JONES, Jr., *Examiner.*